United States Patent
Ray et al.

(10) Patent No.: US 8,158,280 B2
(45) Date of Patent: *Apr. 17, 2012

(54) BATTERY CONTAINER HAVING CRUCIFORM VENT AND COVER

(75) Inventors: Robert E. Ray, Strongsville, OH (US); John C. Stearns, Medina, OH (US); Walter B. Ebner, Terryville, CT (US); Richard L. Bouffard, Litchfield, CT (US); R. Justin Begg, Brunswick, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 1488 days.

This patent is subject to a terminal disclaimer.

(21) Appl. No.: 11/440,309

(22) Filed: May 24, 2006

(65) Prior Publication Data

US 2007/0275295 A1   Nov. 29, 2007

(51) Int. Cl.
  *H01M 2/00* (2006.01)
  *H01M 2/02* (2006.01)
  *H01M 2/38* (2006.01)
  *H01M 2/12* (2006.01)

(52) U.S. Cl. ........... 429/163; 429/164; 429/72; 429/53; 429/82

(58) Field of Classification Search ........... 429/162, 429/163, 164, 174, 178, 53, 72, 82
  See application file for complete search history.

(56) References Cited

U.S. PATENT DOCUMENTS

| | | | |
|---|---|---|---|
| 2,525,436 A | 10/1950 | Williams, Jr. | |
| 3,815,534 A | 6/1974 | Kneusel | |
| 3,826,412 A | 7/1974 | Kneusel | |
| 3,897,270 A * | 7/1975 | Rosansky | 429/56 |
| 4,256,812 A | 3/1981 | Tamura et al. | |
| 4,698,282 A | 10/1987 | Mantello | |
| 4,803,136 A | 2/1989 | Bowsky et al. | |
| 4,842,965 A * | 6/1989 | Urushiwara et al. | 429/56 |

(Continued)

FOREIGN PATENT DOCUMENTS

CH       574350       4/1976

(Continued)

OTHER PUBLICATIONS

Patent Cooperation Treaty (PCT), International Search Report and Written Opinion for Application PCT/US2007/012380 filed May 23, 2007, Mailed Oct. 9, 2007, 15 pgs., European Patent Office, Netherlands.

*Primary Examiner* — Helen O Conley
(74) *Attorney, Agent, or Firm* — Michael C. Pophal

(57) ABSTRACT

An electrochemical cell is provided with an enhanced pressure relief vent formed in a closed end of the cell container that achieves effective venting of gas from the closed end of the container. The electrochemical cell including a container having a first end, a second end, a side wall extending between the first and second ends, and an end wall extending across the first end. The cell has a positive electrode, a negative, and an aqueous alkaline electrolyte, all disposed in the container. The cell further includes a pressure relief vent having a reduced thickness groove formed in the end wall of the container. The reduced thickness groove is formed having eight segments extending radially from a central location. A cover is welded on the end wall of the container via at least three welds, wherein the angular spacing between two adjacent welds is greater than 120°.

17 Claims, 5 Drawing Sheets

U.S. PATENT DOCUMENTS

| | | | |
|---|---|---|---|
| 5,677,076 A | 10/1997 | Sato et al. | |
| 6,087,040 A * | 7/2000 | Ohmura et al. | 429/176 |
| 6,159,631 A | 12/2000 | Thompson et al. | |
| 6,296,970 B1 | 10/2001 | Killebrew | |
| 6,300,006 B1 * | 10/2001 | Janmey et al. | 429/177 |
| 6,346,342 B1 | 2/2002 | Li | |
| 6,348,281 B1 | 2/2002 | Li | |
| 6,472,097 B1 | 10/2002 | Ohbayashi | |
| 6,620,543 B2 | 9/2003 | Li | |
| 6,632,558 B1 | 10/2003 | Sondecker et al. | |
| 2003/0031918 A1 * | 2/2003 | Li | 429/53 |
| 2004/0157115 A1 | 8/2004 | Bouffard et al. | |
| 2006/0078787 A1 | 4/2006 | Sato | |

FOREIGN PATENT DOCUMENTS

| | | |
|---|---|---|
| EP | 354607 A1 | 2/1990 |
| EP | 818838 A | 1/1998 |
| EP | 1079454 | 2/2001 |
| FR | 2627327 | 8/1989 |
| GB | 2334812 | 9/1999 |
| JP | 59154743 | 9/1984 |
| JP | 2284350 | 11/1990 |
| JP | 4215245 | 8/1992 |
| JP | 9161738 | 6/1997 |
| JP | 10284035 | 10/1998 |
| JP | 11213978 | 8/1999 |

* cited by examiner

US 8,158,280 B2

BATTERY CONTAINER HAVING CRUCIFORM VENT AND COVER

BACKGROUND OF THE INVENTION

The present invention generally relates to electrochemical cells (batteries) and, more particularly, relates to an alkaline electrochemical cell having a pressure relief vent formed in the cell container for effectively venting gases at excessive pressure.

Alkaline electrochemical cells employ a container typically in the form of a cylindrical steel can having a closed bottom end, an open top end, and a cylindrical side wall extending between the top and bottom ends. Contained within the can is a positive electrode, also referred to as the cathode, which typically comprises manganese dioxide. Also contained within the can is a negative electrode, also referred to as the anode, which typically comprises zinc. In bobbin-type cell constructions, the cathode may be ring molded or impact molded against the interior surface of the steel can, while the anode is generally centrally disposed within the can. A separator is located between the anode and the cathode, and an alkaline electrolyte solution contacts the anode, cathode and separator. A conductive current collector is inserted into the anode active material. A collector and seal assembly, which typically includes an annular polymeric seal, an inner metal cover, the current collector, and an outer cover, provides closure to the open top end of the steel can to seal closed the steel can.

Conventional alkaline electrochemical cells are commonly sealed closed by placing the collector and seal assembly with the annular polymeric (e.g., nylon) seal in the open end of the steel can and crimping the upper end of the can radially inward and over the outer periphery of the seal to compress the seal against the can. The electrochemically active materials, such as zinc, may generate hydrogen gas and other gases. With the can sealed closed, excessive build-up of high pressure gases within the sealed can may lead to damage to the cell and/or the device in which the cell is employed. Thus, it is desirable to provide a controlled vent mechanism that vents highly pressurized gases from within the can to prevent the pressurized gases from reaching excessive levels that may cause the can to uncrimp and release excessive electrolyte solution and particulate matter.

A common approach to venting excessive pressurized gases from within an electrochemical cell includes the use of a vent formed in the annular polymeric seal of the collector and seal assembly, which is intended to rupture upon experiencing excessive pressure within the sealed volume of the cell. One example of a vent formed as a thin portion in an annular polymeric seal is disclosed in U.S. Pat. No. 5,667,912, with the vent intended to shear when the pressure exceeds a predetermined pressure limit. The conventional approach of employing a vent in the seal structure requires an assembly that generally consumes a significant amount of useable volume within the battery can. This results in less space available for the electrochemically active materials, thus limiting battery service life capability.

In order to minimize space occupied by the collector and seal assembly, it has been proposed to form the pressure relief vent mechanism in the closed bottom end wall of the metal can, and to cover the vent with the positive contact terminal. Examples of a vent and contact terminal provided on the closed bottom end wall of the battery can are disclosed in U.S. Pat. No. 6,620,543 and U.S. Patent Application Publication No. 2004/0157115 A1, the entire disclosures of which is hereby incorporated herein by reference. According to these approaches, the pressure relief vent, formed as a reduced thickness groove in the bottom end wall of the metal can, is formed in one or two semicircular C-shapes generally centered about the central location of the bottom closed end of the can. When the internal pressure exceeds a predetermined limit (relative to the outside atmospheric pressure), the vent ruptures to release pressure from within the internal volume of the battery can to the outside atmosphere. The previous proposed C-shaped vents may, in some situations, require a thin coin thickness, such as 2.0 mils, to yield an acceptable vent pressure. Such thin vents may be susceptible to damage such as during cell manufacturing (e.g., impact molding) and therefore may be unacceptable for some cells.

Typically, welded onto the closed bottom end wall of the conventional battery can is the positive contact terminal or cover which includes an outwardly protruding nubbin having an upstanding wall extending from a peripheral flange that is welded to the closed bottom end wall of the can. Conventionally, the peripheral flange is spot welded to the steel can via three symmetric welds, spaced apart from each other at equal distances, i.e., sequentially located at angles of one hundred twenty degrees (120°). In some proposed batteries, the positive contact terminal is supposed to allow gas to escape between the peripheral flange of the contact terminal and the bottom end wall of the can between adjacent welds. However, due to bulging of the can and resultant flexing of the bottom end wall, and further due to improved low profile walls, and the symmetric spacing of the adjacent welds (e.g., 120°), the peripheral flange of the overlying cover may form a seal against the bottom end wall of the can and prevent proper venting of gas to the outside environment. Thus, proper venting of excessive gases may be inhibited which could lead to a possible crimp release.

Accordingly, it is desirable to provide for an electrochemical cell having an effective vent formed in the battery can. It is further desirable to provide for a battery can that vents excessive gases and has a cover that allows the excessive gases to be effectively released to the outside environment.

SUMMARY OF THE INVENTION

The present invention improves the protective safeguards of an electrochemical cell with an enhanced pressure relief vent formed in a closed end wall of the cell container that allows for use of a low profile seal assembly and achieves effective venting of gases from the closed end wall of the container. To achieve this and other advantages, in accordance with the purpose of the present invention as embodied and described herein, the present invention provides for an electrochemical cell including a container having a first end, a second end, a side wall extending between the first and second ends, and an end wall extending across the first end. The cell has a positive electrode, a negative electrode, and an aqueous alkaline electrolyte, all disposed in the container. The cell further includes a pressure relief vent having a reduced thickness groove formed in the end wall of the container. The reduced thickness groove is formed having at least five segments extending radially from a central location.

According to another aspect of the present invention, the electrochemical cell includes a metal cover welded onto the end wall of the container via at least three welds, wherein the angular spacing between two adjacent welds is greater than one hundred twenty degrees (120°). According to further aspects of the present invention, the angular spacing between two adjacent welds is between one hundred twenty degrees and two hundred forty degrees (120° and 240°), and more specifically in the range of one hundred sixty degrees to one hundred eighty degrees (160° to 180°).

According to a further aspect of the present invention, a metal can is provided for use in an electrochemical cell. The metal can includes a side wall, an open end, and a closed end having an integral metal wall. A pressure relief vent is formed in the metal wall of the closed end of the can. The pressure relief vent has a reduced thickness groove formed having at least five segments extending radially from a central location.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
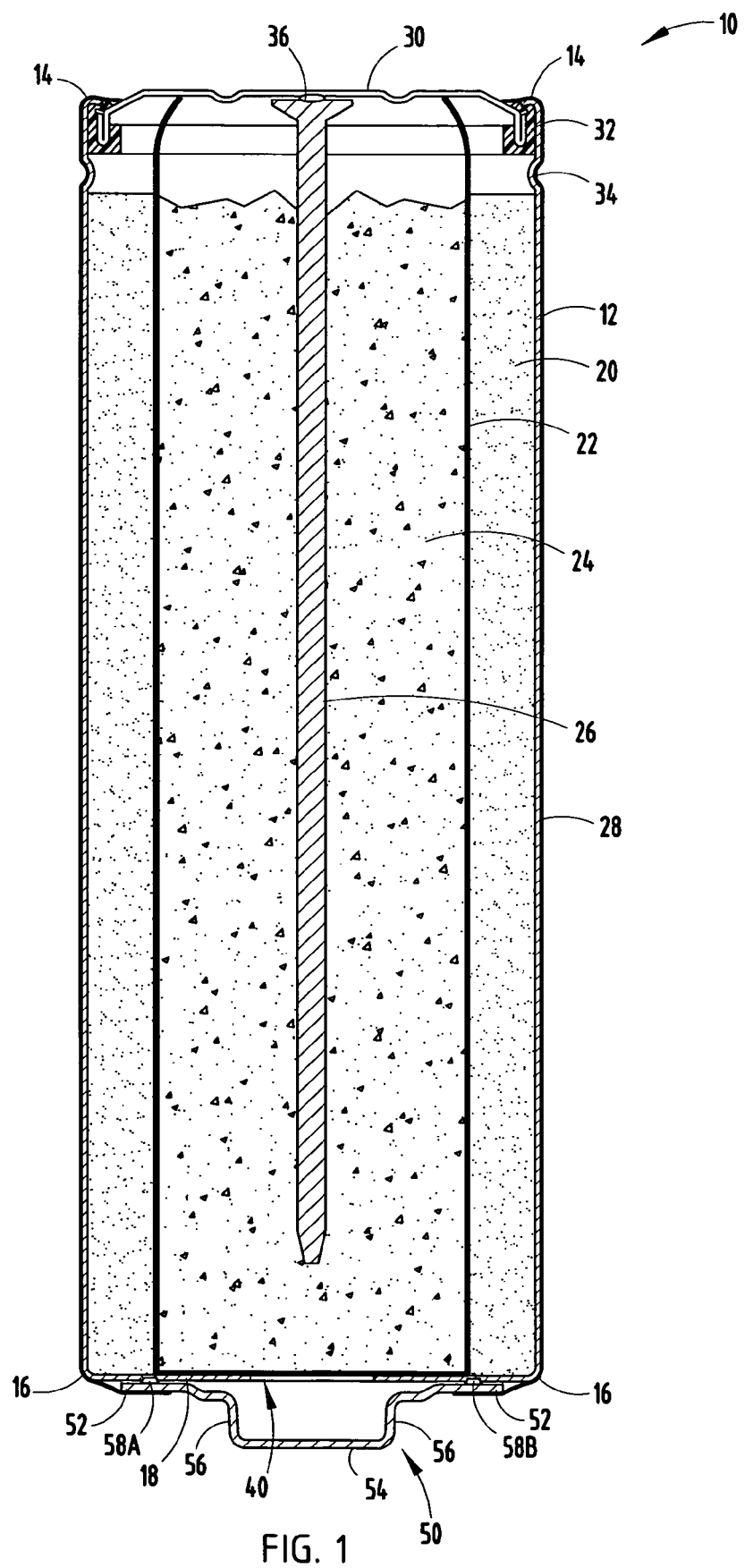
FIG. 1 is a longitudinal cross-sectional view of an electrochemical cell having a pressure relief vent and contact terminal cover provided on the closed bottom end of the cell can, according to one embodiment of the present invention.

Referring to FIG. 1, a cylindrical alkaline electrochemical cell (battery) 10 is generally shown having a stress concentration pressure relief vent mechanism 40 formed in the closed bottom end wall of the cell can 12 and an overlying outer cover 50 welded to the can bottom end wall, according to one embodiment of the present invention. The pressure relief mechanism 40, formed as a reduced thickness groove, operates as a pressure rupturable vent to vent excessive gas from within the battery and, in cooperation with the outer cover 50, provides for the effective release of excessive gases. The electrochemical cell 10 may include a cylindrical alkaline cell, such as an AA-size battery cell, according to one example. It should be appreciated that other shapes and sizes of cells for use in single or multiple cell batteries may employ the vent 40 and cover 50 arrangement according to the teachings of the present invention.

The electrochemical cell 10 includes a container generally shown as a cylindrical steel can 12 having a first or top end 14, a second or bottom end 16, and a cylindrical side wall extending between the top and bottom ends 14 and 16. The second or bottom end 16 of the steel can 12 has a closed end wall 18 integrally formed, in the embodiment shown, during formation of the steel can 12. This may be achieved by a conventional can formation process, such as a deep drawing. Alternately, the closed end wall 18 may be connected, e.g., welded, to the bottom end 16 of the cylindrical side wall to form can 12.

The can 12 and its closed end wall 18 may be made of any suitable metal that can be formed into a desired shape and can be adapted to seal the contents within the cell 10. In the embodiment shown, the steel can 12 also functions as the cathode current collector, and therefore has good electrical conductivity. The internal surface of the steel can 12 may be coated with a material, such as graphite. The external surface of the steel can 12 may be plated to provide corrosion resistance, high electrical conductivity, and an attractive appearance. According to one embodiment, the interior surface of the steel can 12 may be plated with nickel and cobalt, followed by a diffusion annealing process. According to one embodiment, the side wall and closed bottom end wall of steel can 12 may have a thickness in the range of about 0.005 inch to 0.014 inch (0.13 milliliters to 0.36 millimeters) thick. The can side wall and bottom end wall may have the same or different thicknesses.

Welded onto the exterior surface of the closed bottom end wall 18 of steel can 12 is a positive contact terminal or cover 50 that is formed of nickel plated steel. The cover 50 has a protruding nubbin (i.e., protrusion) 54 at its center region, which serves as the positive contact terminal of cell 10. Assembled onto the opposite top end 16 of steel can 12 is a negative contact terminal or cover 30 which forms the negative contact terminal of cell 10. The positive and negative covers 50 and 30 are made of electrically conductive metal and form the respective positive and negative electrical terminals.

A jacket 28 is formed about the exterior surface of steel can 12, and is further formed over the peripheral edge of the closed bottom end wall 18 of can 12. The jacket 28 may include an adhesive layer such as a metalized, plastic film label.

Disposed within the steel can 12 is a cathode 20, also referred to as the positive electrode, which may be formed of a mixture of manganese dioxide ($MnO_2$), graphite, potassium hydroxide (KOH) solution, and additives, according to one embodiment. The cathode 20 may be impact molded in steel can 12 into the shape of a cylindrical ring against the interior side walls of the can 12. This involves compacting the cathode mixture within the steel can 12. Alternately, cathode 20 may be ring molded by inserting one or more preformed molded rings of cathode mixture into the steel can 12.

A separator 22 is disposed within the steel can 12 against the interior surface of cathode 20. Separator 22 may be formed of a non-woven fabric that prevents migration of solid particles in the cell 10. An anode 24, also referred to as the negative electrode, is also disposed within the steel can 12 inside of the separator 22. An alkaline electrolyte is further disposed within steel can 12 and in contact with each of the cathode 20, separator 22, and anode 24. The anode 24 may be formed of zinc powder, a gelling agent, and additives, according to one embodiment. While a bobbin-type cell construction is shown and described herein, it should be appreciated that the electrochemical cell 10 can otherwise be configured, such as a jellyroll (spiral wound) electrode and separator cell construction.

A collector and seal assembly is assembled onto the first or open end 14 of the steel can 12 for closing the open end 14 of steel can 12. The collector and seal assembly shown includes current collector 26, annular polymeric (e.g., nylon) seal 32, and negative contact terminal 30. Current collector 26, which may include a brass nail having an elongated body and enlarged head, is disposed in contact with anode 24 and negative outer cover 30. The negative outer cover 30 extends across the open end 14 of steel can 12 and engages nylon seal 32. The seal 32 may include a ring-shaped polymeric seal having a generally J-shape cross-section, according to one embodiment. The assembly of the seal 32 may include disposing the seal 32 in the open end 14 of steel can 12 on top of a bead 34 formed radially inward on the side wall of can 12, or alternately in a flared opening of can 12, and crimping the upper end of steel can 12 inwardly and over the outer periphery of the seal 32 and negative cover 30 to compress seal 32 against bead 34. The polymeric seal 32 is thereby compressed between the peripheral edge of negative cover 30 and the upper end wall of steel can 12.

It should be appreciated that the negative cover 30 is electrically insulated from the steel can 12 by way of the intermediate polymeric seal 32. The resulting collector and seal assembly shown provides a low volume closure to the open end 14 of steel can 12. It should further be appreciated that other closure assemblies may be employed to seal closed the open end 14 of steel can 12.

Figure 2:
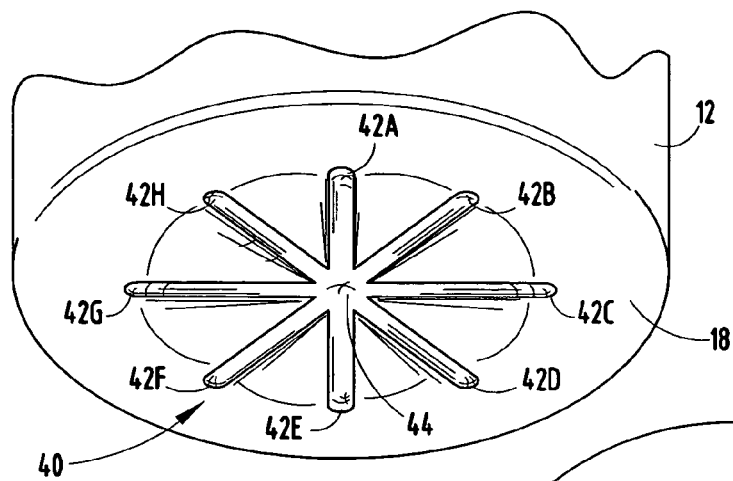
FIG. 2 is a perspective view of the bottom end of the cell can illustrating the cruciform vent formed in the inside surface of the end wall, according to a first embodiment.
Figure 3:
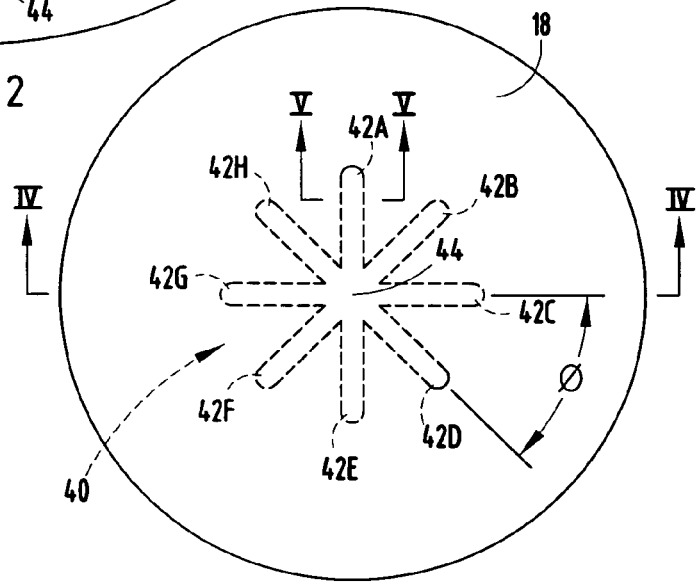
FIG. 3 is a bottom view of the cell, with the cover removed, further showing the internal formed cruciform vent, according to the first embodiment.

According to the present invention, the stress concentration pressure relief vent mechanism 40 is formed in the closed bottom end wall 18 of steel can 12, and the positive cover 50 is welded to the closed end wall 18 and covers the pressure relief vent mechanism 40. The vent mechanism 40 is shown in FIGS. 2 and 3 according to a first embodiment formed as a reduced thickness coined groove formed into the inside surface of the bottom end wall 18 of the steel can 12 in the shape of a cruciform having eight radial extending reduced thickness groove segments 42A-42H. The vent mechanism 40 preferably has at least five radial extending reduced thickness groove segments, and according to one embodiment, has eight radial groove segments. The reduced thickness groove vent 40 acts as a pressure relief mechanism for venting pressurized gases when exposed to an excessive pressure differential. The vent 40 is designed to fracture along one or more of the reduced thickness groove segments 42A-42H upon experiencing excessive pressure.

The pressure relief vent mechanism 40 is centrally located on the closed bottom end wall 18 of steel can 12 with the plurality of reduced thickness segments 42A-42H extending radially from a central location 44 of end wall 18. The pressure relief vent mechanism 40 includes at least five radial extending reduced thickness segments, according to one embodiment. According to another embodiment, vent mechanism 40 includes at least six radial extending reduced thickness segments. According to the embodiment shown, the vent mechanism 40 has eight radial reduced thickness segments 42A-42H, each equiangularly formed at successive separation angles $\phi=45°$. The cruciform vent mechanism 40 may include more than eight radial reduced thickness segments, according to further embodiments.

Figure 4:
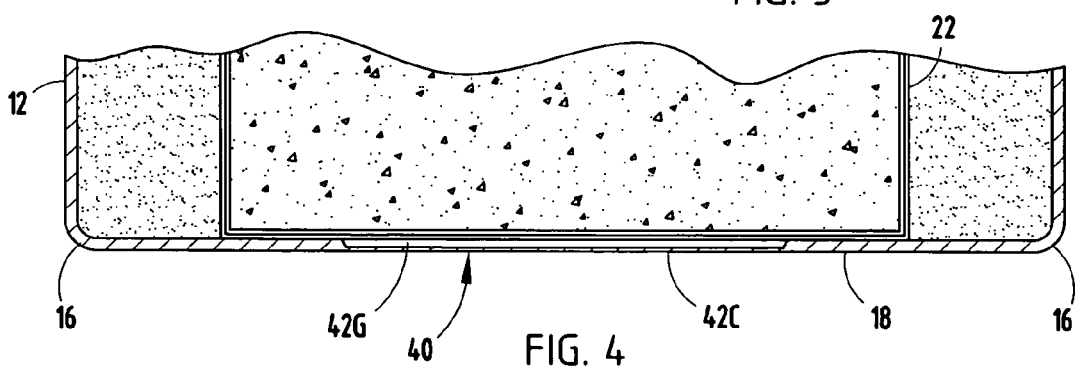
FIG. 4 is an enlarged cross-sectional view of the bottom portion of the cell taken through line IV-IV of FIG. 3, further illustrating the reduced thickness groove vent.
Figure 5:
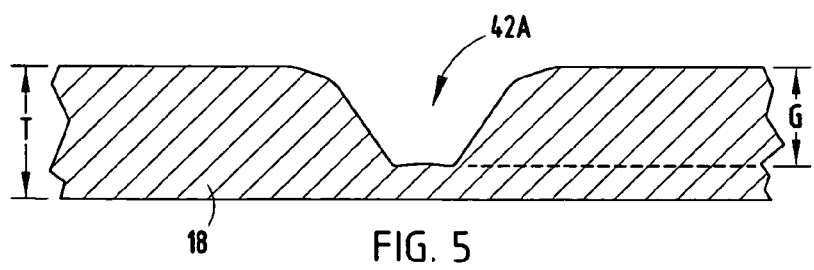
FIG. 5 is an enlarged cross-sectional view taken through line V-V- of FIG. 3 further illustrating the reduced thickness groove vent.

Referring to FIGS. 4 and 5, the reduced thickness groove vent mechanism 40 is further illustrated formed in the inside surface of the bottom end wall 18 of steel can 12. The reduced thickness groove vent mechanism 40 can be formed by any suitable method for producing reduced thickness grooves in metal plates. Suitable methods include stamping, casting, forging, rolling, cutting, grinding, laser scribing and chemical etching. According to one embodiment, the reduced thickness groove vent mechanism 40 is formed by a stamping method, such as coining. It should be appreciated that the reduced thickness groove vent mechanism 40 can be formed either during the can/end wall manufacturing process, or as a separate process. In the coining vent formation embodiment, force is applied to the metal end wall 18, located between a punch and a die, in which either or both of the punch and die can include projections which causes the metal of can 12 to flow into the desired cruciform shape.

The reduced thickness groove of vent mechanism 40, such as groove segment 42A shown in FIG. 5, extends into the bottom end wall 18 of steel can 12 by a depth G. The unthinned bottom end wall 18 of steel can 12 has a thickness T, typically in the range of 5 to 15 mils (0.005-0.015 inches), and more specifically about 6 to 10 mils. The vent mechanism 40 therefore has a metal thickness equal to the difference between the total can thickness T and groove depth G. In one embodiment, the reduced thickness groove of vent mechanism 40 may be formed to a depth G of approximately 5.8 mils in steel can 12 having a thickness T of approximately 8.3 mils, leaving approximately 2.5 mils of steel at the vent 40. When the groove is formed on the inside surface of the bottom end wall 18, the vent mechanism 40 allows for a steel thickness of greater than 2.0 mils, and more particularly, of about 2.5 mils at the bottom of the groove to provide an expected vent rupture pressure of about 900 psi. When the groove is formed on the outside surface of the bottom end wall 18, an even greater steel thickness may be possible at the bottom of the groove. The cruciform shape vent mechanism 40 allows for proper venting at excessive pressure while providing a can thickness in groove 42 that can withstand the forces of impact molding of the cathode 20 without damage.

According to one example, the electrochemical cell 10 is a AA-size cell employing a low carbon, aluminum killed, SAE 1006 or equivalent steel with an inside can plating of nickel and cobalt, and an outside plating of nickel. The steel substrate comprises maximums of 0.08 weight percent carbon, 0.45 weight percent manganese, 0.025 weight percent phosphorous and 0.02 weight percent sulfur; and the grain size of the steel is ASTM 8 to 12. The steel strip may have the following mechanical properties: 45,000 pound maximum yield strength, 60,000 pound ultimate strength, 25 percent minimum elongation in 2 inches (50.8 mm), and 82 maximum Rockwell 15T hardness. The can 12 has a manufactured overall height of approximately 1.3 inches, and an outside diameter of approximately 0.549 inches. A reduced thickness groove vent 40 is centrally located in the closed end wall 18 of can 12 and is defined by a circumscribing circle having a diameter of approximately 0.254 inches, or approximately one-half the diameter of the end wall 18 of steel can 12. The reduced thickness groove vent 40 is shown formed as a substantially trapezoidal shape coined vent which, in one example, has side walls angled at approximately 68° relative to each other, and a substantially flat bottom. The substantially flat bottom of the vent mechanism 40 has a width of approximately 4 mils, as compared to the widest overall width of vent mechanism 40 of approximately 11.4 mils.

The cruciform vent design achieves a reduced vent pressure at a given metal thickness. Therefore, the desired vent pressure can be achieved without as deep of a groove as other vent designs. It should be appreciated that the material and thickness of the can 12, as well as the shape and size of the reduced thickness groove vent 40 may be selected based on various requirements, such as the cell electrochemistry, size and method of closing and sealing the can. It should further be appreciated that the intended pressure at which the pressure relief vent 40 is expected to open may also determine the size and shape of the reduced thickness groove to meet the needs of a particular cell.

When the vent mechanism 40 is formed in the bottom end wall 18 of steel can 12, particularly in the inside surface of end wall 18, the can 12 may bulge outward. The steel can 12 may be reshaped during insertion of the cathode 20, particularly during a cathode impact molding procedure, so as to form a substantially flat bottom end wall 18 of can 12 as seen in FIG. 4. By forming the vent mechanism 40 in the inside surface of end wall 18, impact molding of the cathode 20 may reduce the possibility of damage to the vent due to inversion of the coined vent groove. Additionally, forming of the coined groove on the interior surface has the added advantage of minimizing disturbance of the exterior can surface, which could be prone to rusting in humid or corrosive environments if the nickel plated surface layer is damaged.

The positive contact terminal 50 is welded onto the bottom end wall 18 of steel can 12, such that positive contact terminal 50 covers the pressure relief vent mechanism 40. Thus, contact terminal 50 also acts as a cover that prevents the electrochemical materials (e.g., gas and/or liquid) from spraying directly outward from the cell 10 upon rupture of vent mechanism 40. The positive contact terminal 50 is substantially centered on the bottom end wall 18 such that the cruciform vent 40 is substantially centered relative to positive contact terminal 50. The protruding nubbin 54 of positive terminal 50 has a diameter and height sufficient to allow the cruciform vent 40 to rupture during a venting operation to sufficiently allow for release of excessive pressurized gases and/or liquid from within cell 10.

Figure 6:
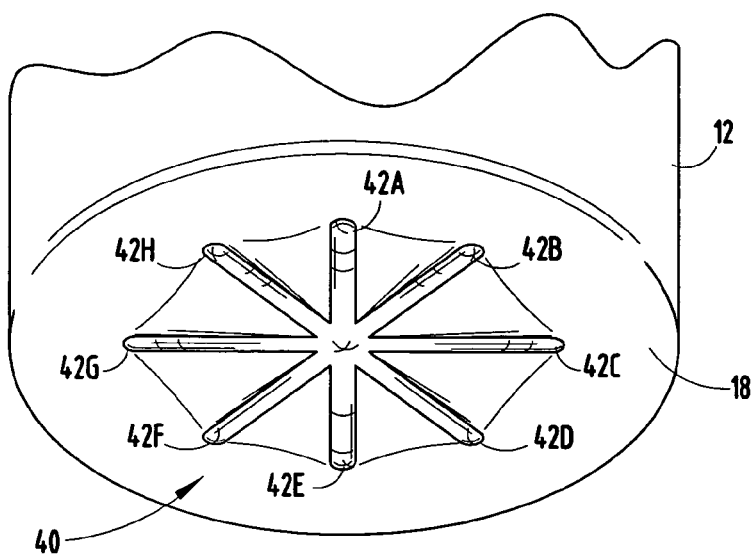
FIG. 6 is a perspective view of the bottom end of a cell can illustrating the cruciform vent formed in the outside surface of the end wall, according to a second embodiment.
Figure 7:
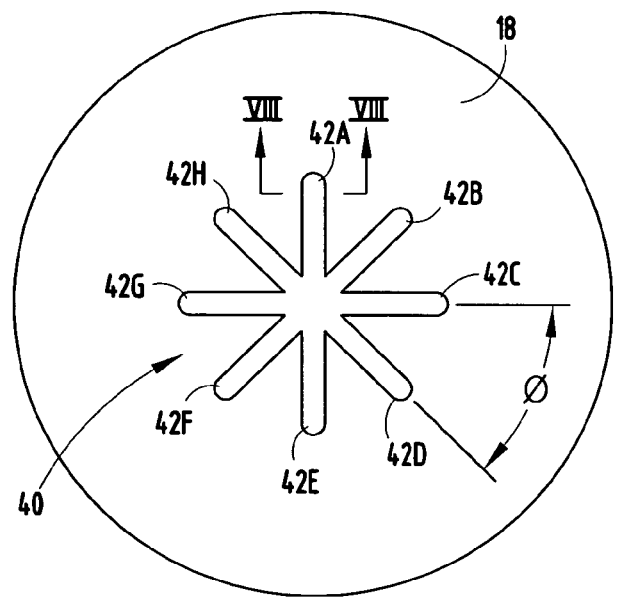
FIG. 7 is a bottom view of a cell with the cover removed shown in FIG. 6 further illustrating the external formed reduced thickness groove vent.
Figure 8:
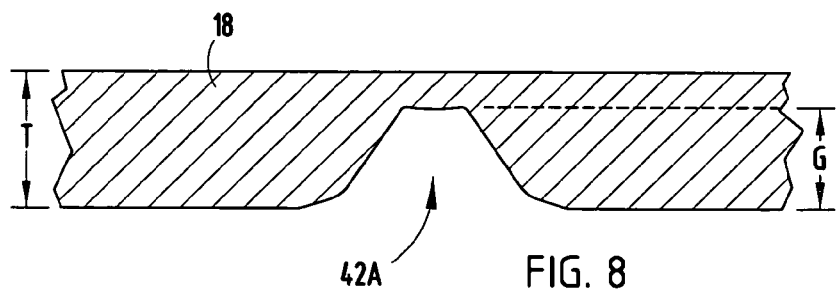
FIG. 8 is an enlarged cross-sectional view taken through line VIII-VIII of FIG. 7 further illustrating the external formed reduced thickness groove vent.

According to a second embodiment, the reduced thickness groove vent mechanism 40 may be formed in the outside (exterior) surface of bottom end wall 18 of steel can 12 as shown in FIGS. 6-8. In the second embodiment, the vent mechanism 40 is formed as a reduced thickness cruciform shape vent having a plurality of radial extending reduced thickness groove segments 42A-42H that are instead formed into the outside surface of the end wall 18. The eight radial reduced thickness groove segments 42A-42H are shown equiangularly formed at successive separation angles φ=45°. The vent mechanism 40 in the exterior formed embodiment may likewise include five or more radial extending groove segments.

In the second or exterior formed vent embodiment, end wall 18 of steel can 12 may be formed by a known approach such as those described above in connection with the first embodiment forming the groove in the inside surface of end wall 18. As shown in FIG. 8, the reduced thickness groove vent mechanism 40 has a depth G formed into the bottom end wall 18 of steel can 12 which has an unthinned can thickness T. The depth G of the groove may be similar to the depth of the groove described in connection with the interior formed vent embodiment. However, it should be appreciated that the formation of the vent mechanism 40 in the interior surface of end wall 18 of steel can 12 may allow for use of a thinner can 12 and/or greater groove depth G because the can 12 is more resistant to damage to the coined region due to inversion by forces during impact molding of the cathode 20.

Figure 9:
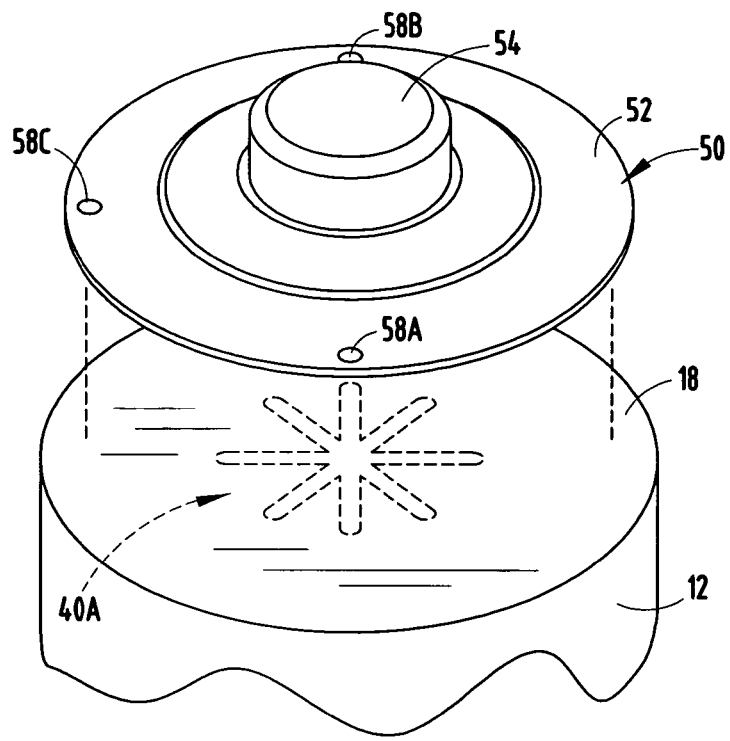
FIG. 9 is an exploded perspective view of the bottom end of the cell illustrating the cover contact terminal welded onto the bottom end wall of the cell can.
Figure 10:
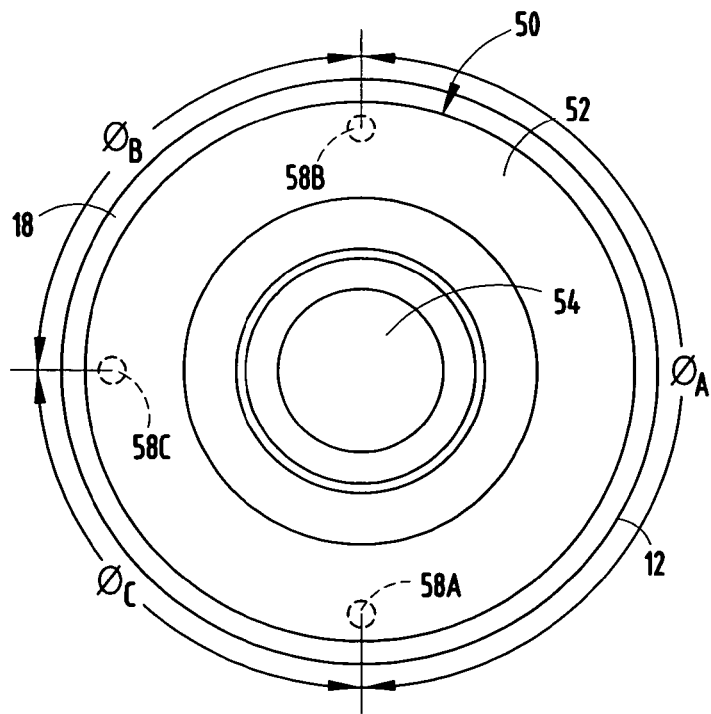
FIG. 10 is a bottom view of the cover contact terminal further illustrating the weld locations shown in phantom.
Figure 11:
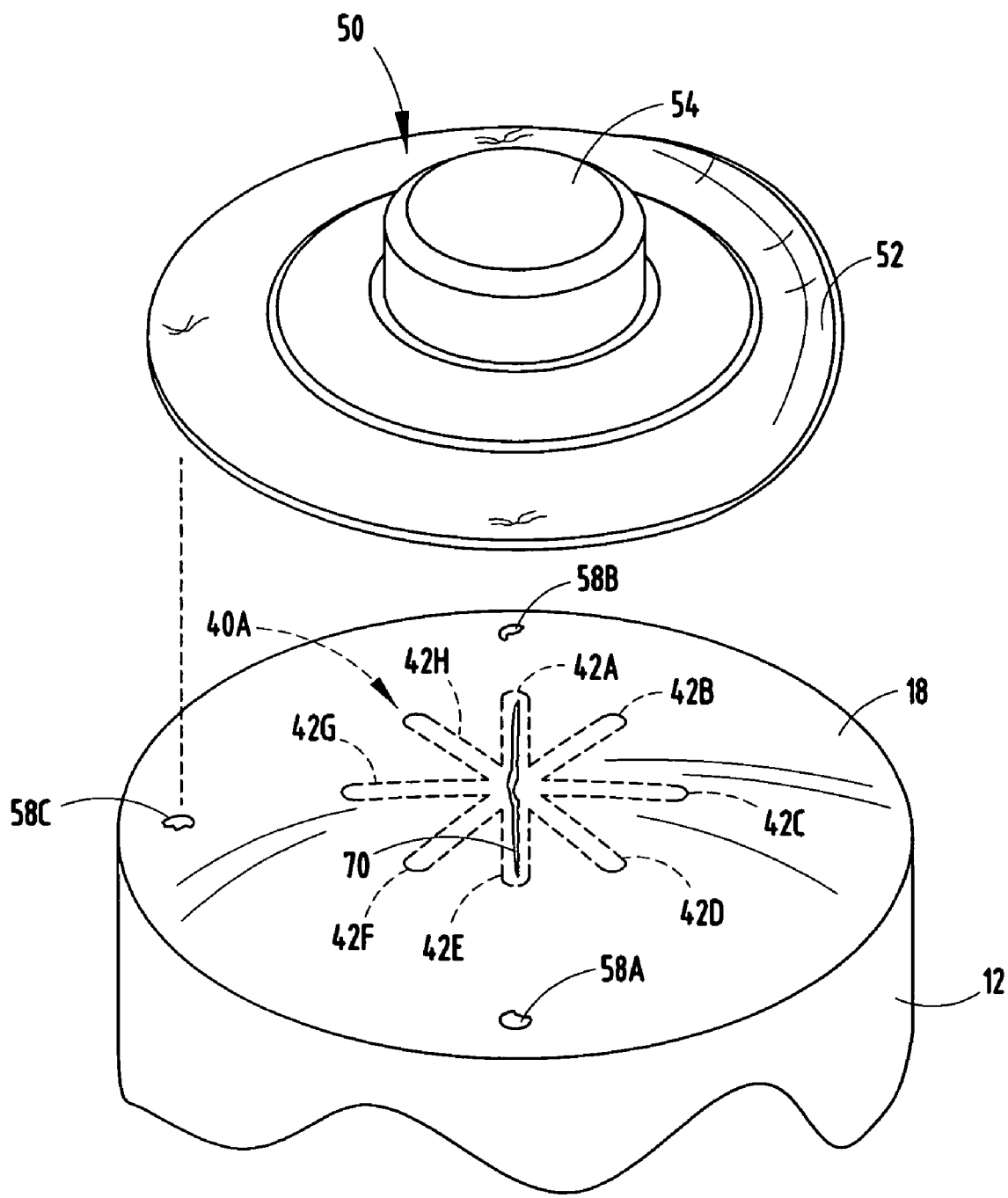
FIG. 11 is an exploded perspective view of the bottom end of the battery illustrating vent rupture and deformation of the cover contact terminal peripheral flange between adjacent welds during a venting operation.

Referring to FIGS. 9-11 the positive cover 50 is connected to the closed end wall 18 of steel can 12 via three welds 58A, 58B and 58C that are specifically located to allow controlled release of the vented gases to the outside atmosphere. Specifically, welds 58A, 58B and 58C are asymmetric in that they are not spaced at equal angles relative to each other. Instead, first and second welds 58A and 58B are angularly spaced apart by an angle $\theta_A$ of about 180°. Second and third welds 58B and 58C are angularly spaced apart by an angle $\theta_B$ equal to about 90°, and third and first welds 58C and 58A are also angularly spaced apart by an angle $\theta_C$ of about 90°. The spacing between adjacent welds 58A and 58B is at angle $\theta_A$ greater than 120°, and more specifically at an angle $\theta_A$ between 120° and 240°, and yet more specifically at an angle $\theta_A$ in the range of 160° to 180°. The angles $\theta_A$, $\theta_B$ and $\theta_C$ are measured from the center point of welds 58A, 58B and 58C as shown in FIG. 10.

The peripheral flange 52 of positive cover 50 has a diameter slightly less than the diameter of the end wall 18 of steel can 12. The welds 58A, 58B and 58C are formed near the outer perimeter of peripheral flange 52. According to the AA-size electrochemical cell example given above, the nubbin 54 has a height of approximately 0.078 inches and a diameter of approximately 0.210 inches. In this example, the welds 58A, 58B and 58C are located approximately 0.24 inches from the center of the closed end wall 18 of can 12 which has a diameter of about 0.54 inches. It should be appreciated that the positive cover 50 has its peripheral flange 52 and protruding nubbin 54 sized to allow for proper venting of the steel can 12, even as the bottom end wall 18 of steel can 12 bulges due to pressure buildup within the can 12.

The peripheral flange 52 of positive cover 50 is made of an electrically conductive material and has a thickness selected to allow the flange 52 to flex during a proper venting operation. As such, the peripheral flange 52 may flex upward when subjected to sufficient pressurized gas and/or liquid underneath the positive cover 50. One example of the peripheral flange 52 flexing upward during a venting operation is shown in FIG. 11. It should be appreciated that by spacing the welds 58A and 58B at an angle $\theta_A$ greater than 120°, or more specifically, at an angle $\theta_A$ between 120° and 240°, or yet more specifically at an angle $\theta_A$ in the range of 160° to 180°, the peripheral flange 52 of positive cover 50 is able to flex more easily between adjacent welds 58A and 58B to allow for vented gases exiting vent 40 to pass to the outside environment.

The welds 58A-58C may include conventional spot welds formed by laser or resistive welding techniques, as examples. However, it should be appreciated that other weld materials may be employed to connect the peripheral flange 52 of the outer cover 50 to the outside surface of the bottom end wall 18 of steel can 12. It should further be appreciated that more than three welds may be employed, in which a separation distance between two adjacent welds has an angle $\theta_C$ greater than 120°, or more specifically at an angle $\theta_C$ between 120° and 240°, or more specifically in the range of 160° to 180°. By employing at least three welds, the cover 50 is connected to the bottom end wall 18 of steel can 12 at connection points that define a plane that maintains the cover 50 onto the bottom end wall 18, while allowing a portion of the peripheral flange 52 extending between welds 58A and 58B to flex and allow for the release of the venting gases and/or liquid during a venting operation.

The bottom end wall 18 of steel can 12 is further shown in FIG. 11 with the vent mechanism 40 ruptured along opening 70 following a venting operation. The vent mechanism 40 is shown ruptured along two of the vent segments 42A and 42E to define the vent opening 70. It should be appreciated that the vent rupture opening 70 may occur in any of the reduced thickness vent segments 42A-42H, and generally the vent mechanism 40 will rupture at least along two of the groove segments 42A-42H. The typical coin vent rupture shown in FIG. 11 is illustrative of one vent operation scenario. Prior to the vent operation, the closed end wall 18 of can 12 will bulge outward as pressure within the can 12 increases and, upon reaching the predetermined vent pressure, the vent 40 will rupture and release the pressurized gases and/or liquid. It should be appreciated that other vent ruptures may occur within vent 40.

Accordingly, the electrochemical cell 10 of the present invention advantageously achieves enhanced and effective venting of gases and/or liquid upon reaching an excessive pressure limit. The cell 10 employs the cruciform vent and outer cover 50 such as to provide effective venting in a manner that minimizes the chance of inhibiting proper venting of gases when excessive pressure is experienced within the cell 10.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
a container having a first end, an open second end, a side wall extending between the first and second ends, a polymeric seal member assembled to the open second end to seal the container closed, and a substantially flat integral end wall extending across the first end;
a positive electrode disposed in said container;
a negative electrode disposed in said container;
an aqueous alkaline electrolyte disposed in said container;
a pressure relief vent comprising a reduced thickness groove formed in the end wall of the container, wherein the reduced thickness groove is formed having at least five segments extending radially from a central location, and wherein the at least five segments of the reduced thickness groove are contained within the substantially flat end wall;
a cover welded onto the end wall of the container via first, second and third welds and extending over the pressure relief vent;
the first, second and third welds located to allow control release of vented gases to outside atmosphere, the first weld is angular spaced 90° from the second weld and the third weld is angular spaced 90° from the second weld and 180° from the first weld; and
a peripheral flange of the cover is defined between the third weld and the first weld and has a thickness selected to allow the flange to flex upwards during a proper venting operation.

2. The electrochemical cell as defined in claim 1, wherein said pressure relief vent comprises at least six segments extending radially from the central location.

3. The electrochemical cell as defined in claim 1, wherein said pressure relief vent comprises at least eight segments extending radially from the central location.

4. The electrochemical cell as defined in claim 1, wherein said pressure relief vent is formed comprising eight substantially equiangularly spaced segments.

5. The electrochemical cell as defined in claim 1, wherein said reduced thickness groove is formed in the inside surface of the end wall of the container.

6. The electrochemical cell as defined in claim 1, wherein the container comprises a steel can having a coating of nickel and cobalt on an interior surface.

7. The electrochemical cell as defined in claim 1, wherein the container is substantially cylindrical and the reduced thickness groove has a cruciform shape.

8. The electrochemical cell as defined in claim 1, wherein the positive electrode comprises manganese dioxide and the negative electrode comprises zinc.

9. An electrochemical cell comprising:
a metal container having a first end, an open second end, a side wall extending between the first and second ends, a polymeric seal member assembled to the open second end to seal the container closed, and an integral end wall extending across the first end;
a positive electrode disposed in said container;
a negative electrode disposed in said container;
an aqueous alkaline electrolyte disposed in said container;
a pressure relief vent comprising a reduced thickness groove formed in the end wall of the container, wherein the reduced thickness groove is formed having at least five segments extending radially from a central location; and
a metal cover welded onto the end wall of the container via first, second and third welds and extending over the pressure relief vent;
the first, second and third welds located to allow controlled release of vented gases to outside atmosphere, the first weld is angular spaced 90° from the second weld and the third weld is angular spaced 90° from the second weld and 180° from the first weld; and
a peripheral flange of the cover is defined between the third weld and the first weld and has a thickness selected to allow the flange to flex upward during a proper venting operation.

10. The electrochemical cell as defined in claim 9, wherein the pressure relief vent comprises at least six segments extending radially from the central location.

11. The electrochemical cell as defined in claim 9, wherein the pressure relief vent is formed having eight substantially equiangularly spaced segments extending radially from the central location.

12. The electrochemical cell as defined in claim 9, wherein the cover comprises a protruding nubbin having a contact surface and an upstanding wall between the contact surface and a peripheral flange.

13. The electrochemical cell as defined in claim 9, wherein the metal container is a substantially cylindrical steel can and the reduced thickness groove has a cruciform shape.

14. The electrochemical cell as defined in claim 9, wherein the integral end wall is a substantially flat end wall, and wherein the at least five segments of the reduced thickness groove are contained within the substantially flat end wall.

15. The electrochemical cell as defined in claim 9, wherein the positive electrode comprises manganese dioxide and the negative electrode comprises zinc.

16. The electrochemical cell as defined in claim 9, wherein the cell comprises a cell construction having the positive electrode in the shape of a cylindrical ring against an interior side wall of the metal container, a separator disposed against an interior surface of the positive electrode, and the negative electrode is disposed inside the separator.

17. The electrochemical cell as defined in claim 1, wherein the cell comprises a cell construction having the positive electrode in the shape of a cylindrical ring against an interior side wall of the container, a separator disposed against an interior surface of the positive electrode, and the negative electrode is disposed inside the separator.

* * * * *